United States Patent [19]
Rettler

[11] Patent Number: 4,826,112
[45] Date of Patent: May 2, 1989

[54] CORD MANAGER

[75] Inventor: Randal L. Rettler, Appleton, Wis.

[73] Assignee: Krueger, Inc., Green Bay, Wis.

[21] Appl. No.: 161,732

[22] Filed: Feb. 29, 1988

[51] Int. Cl.⁴ .............................................. F16L 3/08
[52] U.S. Cl. .................................. 248/65; 174/68.3; 248/74.5
[58] Field of Search .................... 248/49, 65, 68.1, 72, 248/74.5, 345.1; 174/68 C, 70 C, 72 C, 97; 49/462, 460; 24/563

[56] References Cited

U.S. PATENT DOCUMENTS

| | | | |
|---|---|---|---|
| 1,679,117 | 7/1928 | Dye | 248/345.1 |
| 1,753,013 | 4/1930 | Lindmark | 248/74.1 X |
| 1,772,687 | 8/1930 | Reinke | 248/74.5 X |
| 1,794,102 | 2/1931 | Comins | 174/68 C |
| 1,968,596 | 7/1934 | Benander | 248/74.1 |
| 2,230,734 | 2/1941 | Antwerp | 174/68 C |
| 2,231,153 | 2/1941 | Camiener | 248/74.5 X |
| 2,945,081 | 7/1960 | Bogese et al. | 174/68 C |
| 4,454,374 | 6/1984 | Pollack | 174/68 C |
| 4,527,759 | 7/1985 | Dorner et al. | 248/68.1 X |

FOREIGN PATENT DOCUMENTS

| | | | |
|---|---|---|---|
| 1312799 | 11/1962 | France | 174/97 |
| 1420216 | 1/1976 | United Kingdom | 174/72 C |

Primary Examiner—Robert W. Gibson Jr.
Assistant Examiner—Karen J. Chotkowski
Attorney, Agent, or Firm—Fuller, Puerner & Hohenfeldt

[57] ABSTRACT

A cord manager is used in conjunction with a vertical wall panel in an office or other work place. The cord manager comprises an elongated channel adapted to removably interfit with a cooperating slot in the wall panel. The wall panel slot has an interior chamber and a restricted passageway leading to the chamber. The channel has a generally S-shaped section with a first reverse bend that fits within the slot passageway and a second reverse bend that is captured within the slot chamber. The channel S-shaped section connects to a U-shaped section that has a free end that abuts the structure, thereby forming an enclosed raceway outside the panel for enclosing electrical wires.

8 Claims, 1 Drawing Sheet

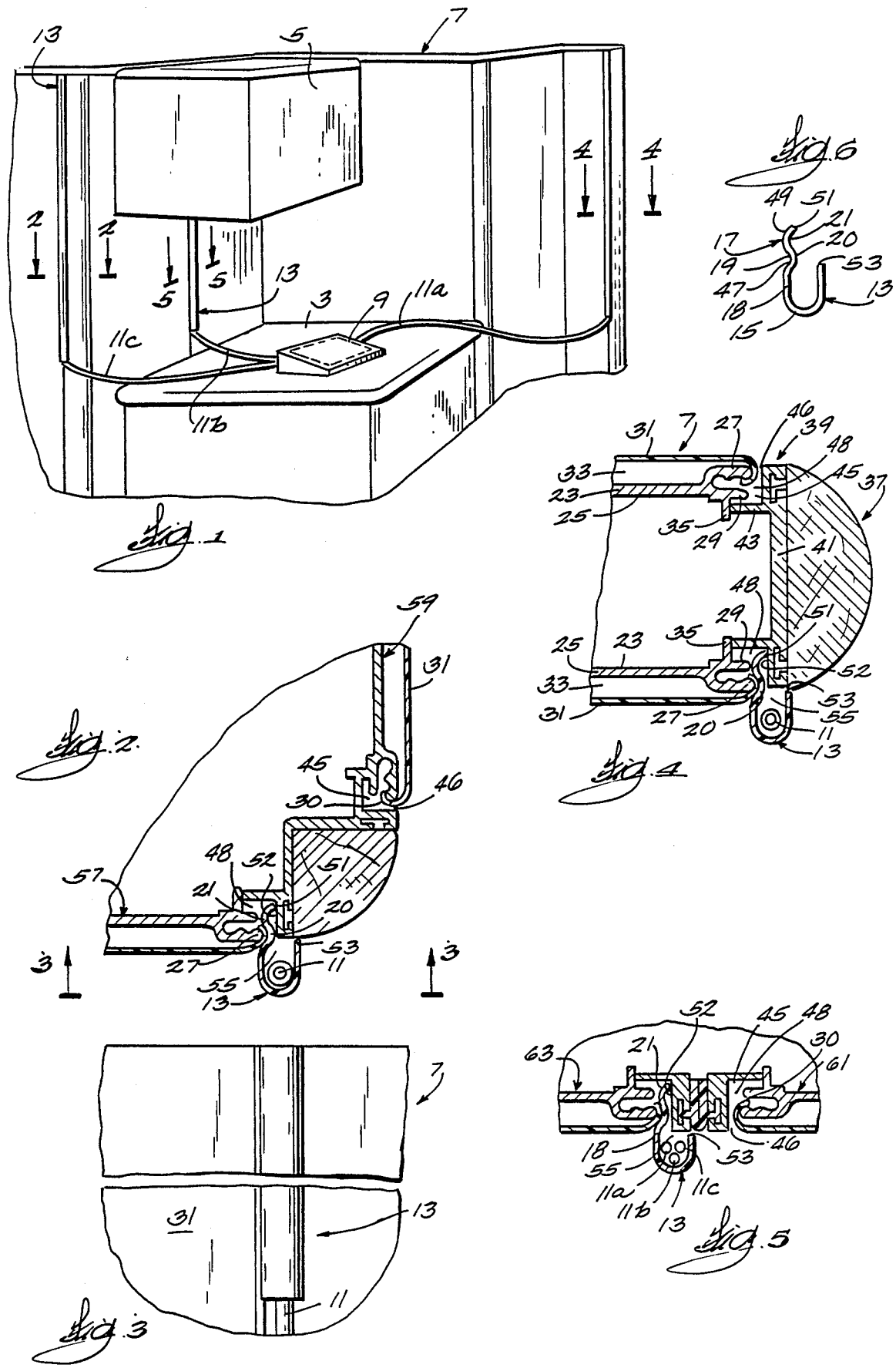

CORD MANAGER

BACKGROUND OF THE INVENTION

1. Field of the Invention

This invention pertains to wire management, and more particularly to routing electrical wires in a work place.

2. Description of the Prior Art

Much effort has been expended in recent years to match aesthetics with functional requirements in a work environment. Most office equipment and furniture are currently being designed to improve worker performance through the improvement of his surroundings. A modern concept is that work station components such as desks, storage cabinets, and vertical wall panels are arrangeable into a wide variety of attractive modular configurations. As a result, work stations can be readily modified to suit changing functional requirements without detracting from their appearance.

A problem associated with modular work stations is the routing of electrical wires. The profusion of power, communications, and data handling equipment in the modern office has often resulted in a maze of wires at the work station. Many desks and tables are designed to hide the various wires within them, but that technique does not solve the problem of concealing and protecting the wires between the individual work stations and the building service outlets. Some vertical wall panels are designed with wireways of various types. The wireways are useful for carrying wires for at least part of the distance between a work station and a service outlet. Prior panel wireways are usually completely enclosed within the interior of the panels, such as within the panel base. While that design does provide a neat appearance and adequate protection, it is also costly. Further, it is relatively difficult to change or add wires to the interiors of prior panels.

Thus, a need exists for improved products for arranging electrical wires in a work place.

SUMMARY OF THE INVENTION

In accordance with the present invention, a versatile wire manager is provided that conveniently and economically encloses and guides electrical wires at a building work station. This is accomplished by apparatus that includes one or more elongated channels adapted to be removably attached to the exteriors of vertical wall panels.

Each channel has a first generally U-shaped section with a cross-sectional area sufficient to carry several wires. To one leg of the first section is integrally attached a second generally S-shaped section. The S-shaped section is designed to fit within a longitudinally extending slot within the vertical wall panel, such as between the panel frame and a decorative cover. The slot has a relatively narrow passageway leading into an enlarged chamber. The slot is generally defined by the decorative cover and the ends of a pair of ridges that form a portion of the panel frame and that terminate at different distances from the cover. The outside ridge is closer to the cover than the inside ridge, thereby cooperating with the decorative cover to form the narrow passageway. The inside ridge and decorative cover cooperate to form the enlarged chamber.

The S-shaped section has a first reverse bend adjacent the U-shaped section and a second reverse bend near the free end of the S-shaped section. The first reverse bend is sized to fit within the passageway of the vertical wall panel slot. The concave side of the S-shaped section first bend loosely engages the end of the panel frame outside ridge. The S-shaped section second bend is locatable within the slot chamber, where it is retained by the frame outside ridge.

The S-shaped section may be slid longitudinally into the panel slot from either end. Alternately, the channel may be snapped transversely into the slot. For that purpose, the channel is preferably made of a tough but elastic plastic material, such that the S-shaped section may be slightly flattened as the second reverse bend is pulled into the slot passageway and over the frame outside ridge. With the S-shaped section within the wall panel slot, the free end of the U-shaped section is in close contact with the panel, thereby creating an enclosed raceway for the wires. although the U-shaped section is outside of the panel, its relatively small size does not detract from the panel appearance. At the same time, the external location of the channel makes wire changing a quick and easy task.

Other advantages and features of the invention will become apparent to those skilled in the art upon reading the detailed disclosure.

BRIEF DESCRIPTION OF THE DRAWINGS

FIG. 1 is a perspective view of a typical work station that advantageously employs the wire manager of the present invention.

FIG. 2 is an enlarged cross-section view taken along lines 2—2 of FIG. 1.

FIG. 3 is a view taken along lines 3—3 of FIG. 2.

FIG. 4 is an enlarged cross-sectional view taken along lines 4—4 of FIG. 1.

FIG. 5 is an enlarged cross-sectional view taken along lines 5—5 of FIG. 1.

FIG. 6 is an end view of the wire manager of the present invention.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention defined in the claims appended hereto.

Referring to FIG. 1, a work station 1 is illustrated that includes the present invention. The work station shown is merely representative of a wide variety of modular and other types of work stations that combine various components of conventional tables, desks, storage cabinets, and chairs, as is known in the art. The work station 1 shown includes a work station 3, a storage cabinet 5, and a series of vertical wall panels 7.

Reference numeral 9 is representative of any of the types of electrical equipment that is routinely used at modern work stations. Such electrical equipment includes power devices such as lights, communications equipment such as telephones, and data handling equipment such as computers. A common feature of all electrical equipment 9 is that they must be connected to a source of electrical power. Again merely by way of example, the electrical component 9 is shown with three wires 11a, 11b, and 11c connecting the equipment to a power source, not shown.

In accordance with the present invention, management of the wires 11a, 11b, and 11c is provided in conjunction with the vertical wall panels 7. The wire management is in the form of elongated channels 13 that are removably retained in the panels near various edges thereof. Turning to FIG. 6, each channel 13 is fabricated with a generally U-shaped section 15 and a generally S-shaped section 17 integrally joined to leg 18 of the U-shaped section. The S-shaped section 17 has first and second reverse bends 19 and 21, respectively. The first reverse bend 19 is convex at the surface 20 toward and approximately in line with the free end 53 of the U-shaped section. The S-shaped section free end 51 is approximately colinear with the convex surface 20. The preferred material for the channel is a polyvinylchloride plastic type I grade I that meets U.L.90-VO rating.

Now looking at FIGS. 2-5, each panel 7 is composed of a frame 23 that has two spaced parallel legs 25. Each leg 25 terminates in an outside ridge 27 and an inside ridge 29. The outside ridge 27 extends slightly beyond the inside ridge 29. Inwardly facing platforms 35 are joined to the inside ridges 29. A decorative fabric 31 in combination with an acoustic material 33 usually covers the frame legs 25 and wraps around the ridges 27. The margin 30 of the fabric 31 is bonded to the frame between the two ridges 27 and 29. Each panel 7 further comprises a cover piece 37. The cover piece 37 includes a frame 39 having a flat base 41 and a pair of spaced supports 43. The cover piece may be joined to the frame 23 by any suitable means, such as hooks and slots, not shown.

A longitudinally extending slot 45 is created by the cooperation of the panel frame 23 and the cover piece 37. The slot 45 is bounded by the cover piece frame 39 and support 43, and the inner ridge 29 and the outer ridge 27 of the panel frame 23. The slot has a restricted passageway 46 that lies between an inner chamber 48 and the outside of the wall panel 7. The passageway 46 is bounded by the cover base 41 and the frame outside ridge 27. The chamber 48 is partially bounded by the cover base 41 and the inside ridge 29.

The wire management channel 13 is removably inserted in the slot 45 by means of the S-shaped section 17. For that purpose, the first bend 19 of the S-shaped section is dimensioned and shaped such that the concave surface 47 of the first bend loosely interfits over the outside ridge 27 and over the fabric margin 30. The convex surface 49 of the S-shaped section second bend 21 is proximate the end of the inside ridge 29. The free end 51 of the S-shaped section is located so as to lightly contact the underside 52 of the base 41. Thus, when installed in a panel 7, the channel is retained against unintended lateral removal because the bend 21 is captured in the chamber 48. On the other hand, intentional lateral removal of the channel is possible because of the flexible and elastic nature of the polyvinylchloride material. Pulling the channel laterally outwardly causes the second reverse bend 21 to flatten so that the second bend can be pulled from the chamber and through the passage 46.

When installed in a panel 7, the free end 53 of the U-shaped section 15 closely abuts the decorative cover piece 37. Consequently, channel 13 and cover piece 37 cooperate to create a raceway 55 for enclosing the electrical wires 11a, 11b, and 11c.

The versatility of the channel 13 of the present invention is illustrated in FIGS. 2 and 5. In FIG. 2, the channel is illustrated as being used at the corner of two vertical wall panels 57 and 59. In FIG. 5, two vertical wall panels 61 and 63 are shown in end facing relationship with the channel retained at the junction of the panels.

Thus, it is apparent that there has been provided, in accordance with the invention, a cord manager that fully satisfies the objects, aims, and advantages set forth above. While the invention has been described in conjunction with specific embodiments, it is evident that many alternatives, modifications, and variations will be apparent to those skilled in the art in light of the foregoing description. Accordingly, it is intended to embrace all such alternatives, modifications, and variations as fall within the spirit and broad scope of the amended claims.

I claim:

1. A cord manager comprising an elongated channel having a generally U-shaped section having first and second generally straight and parallel legs, and a generally S-shaped section integrally joined to and lying generally coplanar with the U-shaped section first leg, the S-shaped section having a first reverse bend adjacent the U-shaped section first leg and a second reverse bend remote therefrom, the S-shaped section first reverse bend being convex toward the U-shaped section second leg.

2. In combination with a structure defining an elongated slot having a restricted passageway leading to an interior chamber, the passageway being partially defined by a longitudially extending ridge, a cord manager comprising an elongated channel having a generally U-shaped section with first and second legs and a generally S-shaped section having first and second reverse bends with the first reverse bend being integrally joined to the U-shaped section first leg, the S-shaped section first reverse bend being located within the passageway and the S-shaped section second reverse bend being captured within the structure chamber, the U-shaped section second leg having a free end that closely abuts the structure to thereby define a closed raceway for enclosing electrical wires.

3. The combination of claim 2 wherein the S-shaped section first reverse bend is convex toward the U-shaped section second leg.

4. The combination of claim 3 wherein the convex surface of the S-shaped section first reverse bend is approximately colinear with the free end of the S-shaped section to thereby assist in retaining the Sshaped section second reverse bend within the slot chamber.

5. Apparatus for managing electrical wires comprising:
  a. a structure defining an elongated slot formed as a chamber within the structure and a restricted passageway leading from outside the structure to the chamber; and
  b. an elongated channel removably inserted into the structure slot, the channel having a generally S-shaped section retained in the structure slot, and a generally U-shaped section attached to the S-shaped section, the U-shaped section cooperating with the exterior of the structure to form a raceway for electrical wires.

6. The apparatus of claim 5 wherein:
  a. the channel U-shaped section has a generally straight first leg with a free end that closely abuts the structure exterior to cooperate therewith to form the raceway; and
  b. the channel U-shaped section has a generally straight second leg that is generally parallel to the U-shaped section first leg and that is integrally joined to the S-shaped section, the plane of the S-shaped section being generally coplanar with the U-shaped section second leg.

7. The apparatus of claim 6 wherein:
a. the S-shaped section has a first reverse bend adjacent a U-shaped section second leg and the second reverse bend remote therefrom;
b. the S-shaped section first reverse bend is located within the structure restricted passageway; and
c. the S-shaped section second reverse bend is captured within the structure chamber.

8. The apparatus of claim 6 wherein the channel is made from a flexible and elastic polyvinylchloride plastic type I grade I to thereby permit elastic flattening of the S-shaped section second reverse bend to permit passage thereof through the restricted passageway for inserting the second reverse bend into and removing it from the structure interior chamber.

* * * * *